UNITED STATES PATENT OFFICE.

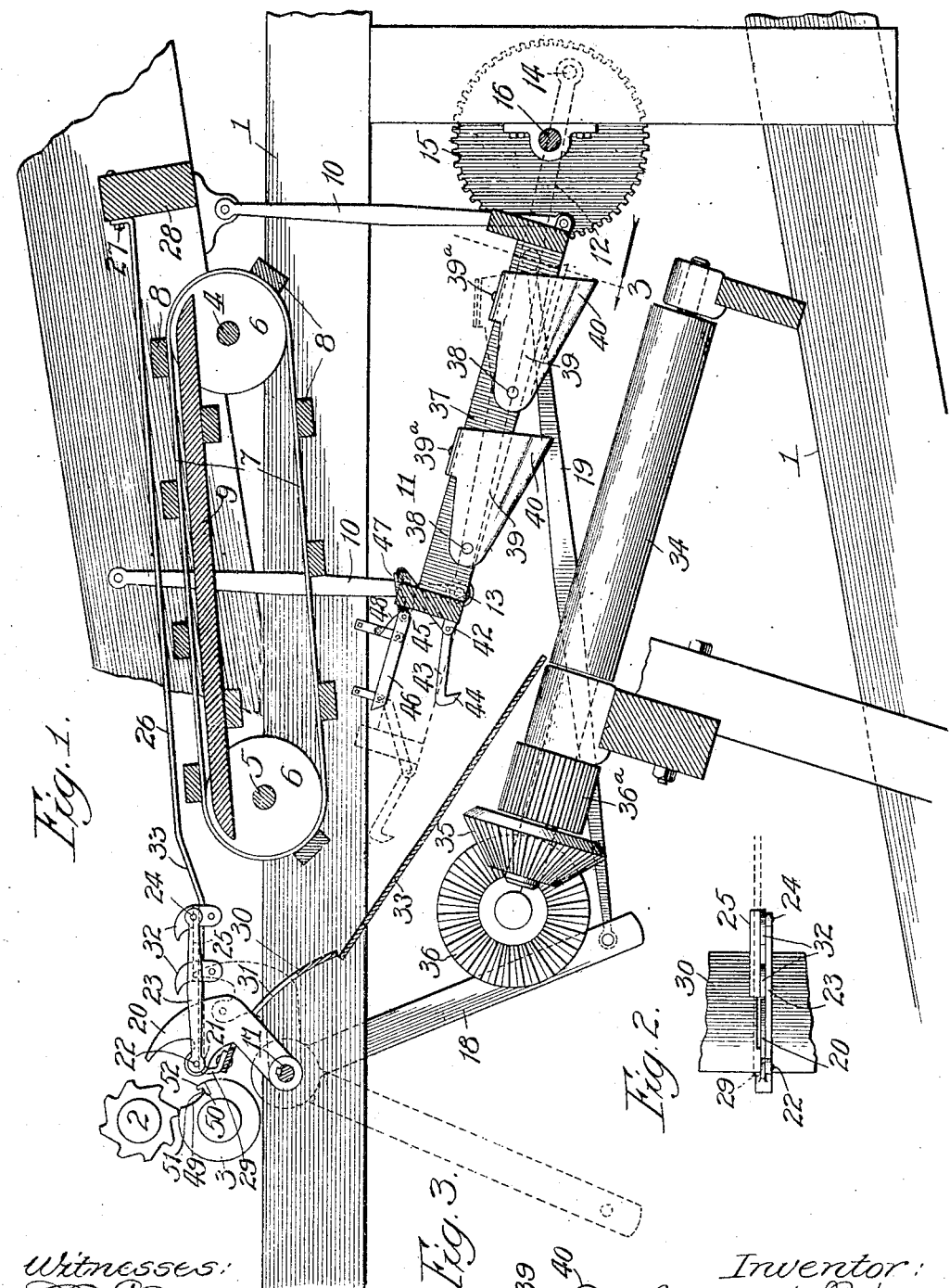

JAMES W. PAIGE, OF CHICAGO, ILLINOIS, ASSIGNOR, BY MESNE ASSIGNMENTS, TO GARLAND-VILA MANUFACTURING COMPANY, OF MUSKEGON, MICHIGAN, A CORPORATION OF MAINE.

CORN-HUSKING MACHINE.

No. 851,771.

Specification of Letters Patent.

Patented April 30, 1907.

Application filed February 15, 1906. Serial No. 301,232.

*To all whom it may concern:*

Be it known that I, JAMES W. PAIGE, a citizen of the United States, residing at Chicago, in the county of Cook and State of Illinois, have invented certain new and useful Improvements in Corn-Husking Machines, of which the following is a description, reference being had to the accompanying drawings, forming a part of this specification, in which corresponding reference-numerals in the different figures indicate like parts.

The primary object of my invention is to provide improved means in connection with a corn husking machine, for advancing the stalks into operative engagement with the feed-rolls, to insure uniformity in feeding and to prevent clogging; and further objects are, to provide an improved form of feed roll, to provide improved means for prevention of clogging at the head or upper end of the husking-rolls, and to provide co-acting means whereby the ears to be husked may be so controlled in their movements that each may be brought into contact with said husking rolls in such a way as to cause them to be completely husked. I accomplish said objects in the manner and by means of the combination of elements hereinafter more particularly described and claimed.

In the drawings, Figure 1, is a vertical longitudinal sectional view of a portion of a corn-husking machine embodying the features of my invention, Fig. 2, is a plan view of the supplemental feeding mechanism, and Fig. 3, is a sectional view taken upon the line 3—, viewed in the direction of the arrow there shown, to show the device for pressing the ears upon the husking rolls.

Referring to the drawings, 1 represents a portion of the usual well known frame of a corn husking machine, in which, in suitable bearings, are mounted upper and lower feed rolls 2, 3, for feeding the stalks and removing the ears therefrom. Supported in bearings within the frame are transverse shafts 4, 5, having pulleys 6, 6, mounted upon the respective ends within the frame, said pulleys having belts 7 trained thereon, which belts in turn have cross-slats 8 attached thereto, thereby forming the usual apron beneath the upper portion of which is located a stationary inclined feed-board 9, supported in the usual way. The shafts supporting the pulleys may be driven from any suitable source of power.

Jointedly suspended by means of links 10, 10, located within the frame and upon opposite sides thereof, is a downwardly and rearwardly inclined frame, generally designated by 11, which is adapted to be oscillated lengthwise of the machine by means of a pitman 12, one end of which pitman, indicated in dotted lines in Fig. 1, is jointedly attached to said frame at 13, while the other is connected in like manner with a wrist-pin 14 upon a gear-wheel 15, mounted upon a transverse shaft 16, said gear-wheel being connected with a suitable source of power. Keyed to a rock-shaft 17 arranged parallel to and somewhat below and slightly in front of the plane of the feed-rolls, is a depending arm 18, the lower end of which is jointedly connected by means of a pitman 19 to the frame 11, by which said shaft may be rocked. Splined or otherwise rigidly attached to said rock-shaft is one or more forwardly curved metal fingers 20, Figs. 1 and 2, the end of which is adapted to be moved upward and forward into close proximity to the feed-rolls when the shaft is rocked. Upon the front of the finger 20 and extending forward below the upper end, is an integral projection 21, to which, at 22, is jointedly connected a link 23, the rear end of which is jointedly attached at 24, to a sliding block 25, Fig. 3, and indicated in dotted lines in Fig. 1, having a longitudinal groove upon its inner face adapted to receive and fit loosely upon a guide rod 26, the rear end of which is attached at 27 to a cross bar 28 of the frame, while the front end is supported by means of a bracket 29, which, in turn, is bolted to the upper edge of a downwardly and rearwardly inclined apron 30, having a slot 31 formed therein to permit the oscillation of the part 20. Riveted or bolted to the block 25 upon the opposite side of the rod 26 from said block, is one or more, but preferably two forwardly bent teeth 32, which are adapted to move with said block. The guide-rod is preferably inclined at 33, and as the tooth or forcer 20 is oscillated, the block and teeth are caused to vibrate back and forth up and down the incline.

As is well known, the corn stalks are fed to the feed-rolls with the large or butt ends foremost; and, if a stalk is cross-wise of the bundle, it is liable to cause an obstruction and prevent the other stalks from entering the rolls. The constant oscillation of the finger 20 tends to force any such obstructing element between the rolls, while the teeth 32 supplement such action by forwarding anything which may chance to lie too far back to be caught by the finger 20. I do not wish to be limited to any given number of these forcing devices. In a small machine in which the feed-rolls are short, a single one may serve the purpose; but in larger machines there may be more. I would recommend about four for machines having the longest feed-rolls.

An inclined apron 33, extends from the lower edge of the apron 30 to the upper end of the inclined husking rolls 34, which latter are arranged in pairs, side by side in the usual way, and driven in opposite directions with respect to each other by means of beveled gears 35, 36 and pinions 36$^a$, as ordinarily contemplated.

One longitudinal bar 37, is secured in the frame generally designated by 11, above each pair of rolls and in the vertical plane of the meeting faces thereof, and upon each of said bars, is pivoted at 38, one or more, but preferably two, presser members 39, each of which is formed from a single piece of sheet metal, and is, when completed, substantially triangular in shape as shown in side elevation. Said member is made hollow so as to inclose the bar 37, the meeting parts being joined at the top by means of a rivet 39$^a$. The lower portion of said member is expanded laterally as shown at 40, and concaved at the bottom as shown at 41, Fig. 3, to conform more or less to the shape of the ears. As the ears slide downwardly upon the husking rolls, said members press thereon with a yielding pressure, thereby bringing them all into operative contact with the rolls. Should the ears tend to clog, the forward movement of the pressers tend positively to force them along, while upon the backward swing of the frame 11, the pressers ride over the ears with a yielding pressure. Inclosing the bars as they do, there are no corners or surfaces against which the material may clog.

It frequently occurs in practice that the ears pile up in bunches before reaching the husking rolls; and in order to overcome this tendency, I provide a movable gravity dog, preferably for each pair of rolls which serves to rake the ears downwardly with each downward movement of the frame. Pivoted upon a lug 42 is a dog consisting of an arm 43 having a hook 44 upon its forward end and a rearwardly and upwardly bent part 45 having a laterally bent portion upon its upper end adapted to be brought into contact with a guide-bar 46 rigidly attached to the frame. To the rear end of the latter is jointedly attached a pointed finger 47 which is held in an upwardly inclined position by means of a light spring 48. Where more than one set of husking rolls is employed the part 42 may consist of a rock-shaft to which the hooked arms 43 may be keyed, and all may be actuated by means of a single arm 45 and a single guide-bar 46. The operation of said device is as follows: When the frame 11 is swung toward the feed-rolls, the laterally bent part of the arm 45 being beneath the end of the finger 47, the part 45 is depressed and caused to pass beneath the bar 46, thereby lifting the hook 44 and causing it to pass over the ears of corn; but as soon as the frame reaches the limit of its upward movement, the end of the part 45, having passed beyond the bar 46, the weight of the part 43 causes it to tilt, and in its reverse movement it rides over the part 46, thereby enabling the hook 44 to fall and act upon the corn ears. The yielding of the part 47 permits the bent end of the part 45 to ride off from said part, when the operation is free to be repeated. The reciprocatory raking action of the hook prevents the ears and other accumulations from clogging above the husking rolls.

A difficulty with feed rolls is that when the working faces become dull, it becomes difficult to feed the stalks without clogging. In the feed roll 3 I have shown means for overcoming this objection. In the longitudinal groove 49 is formed a radial face or surface to which is fitted a longitudinal bar, the main body 50, of which is removably attached by means of screws 51 to said radial face. A working face 52 is formed upon said bar at right angles or substantially so, to the main body. When the working face 52 becomes dull, said bar may be removed, the face sharpened and the bar replaced. While I have shown but one groove and but one removable bar, it is obvious that said roll may be made with a plurality of such grooves and bars.

Having thus described my invention, I claim:—

1. The combination with the feed rolls of a corn husking machine of a feed hopper and a feed-forcing mechanism consisting of a rock-shaft, having forwardly curved teeth mounted to oscillate thereon in front of said rolls, upwardly and forwardly inclined teeth mounted in guides in the pathway of the stalks behind said first named teeth and means for connecting the two sets of teeth whereby the oscillation of the former may serve to reciprocate the latter.

2. The combination with the feed-rolls of a corn-husking machine, of a feed-hopper, guide rods extending longitudinally thereof to a position immediately in front of the feed rolls, upwardly and forwardly inclined teeth mounted upon suitable supports fitted respectively to slide upon said rods, a rock-shaft, means for actuating the same and means for operatively connecting said rock-shaft with said tooth supports.

3. The combination with the feed-rolls of a corn-husking machine, of a feed hopper, guide-rods extending longitudinally thereof to a position in front of the feed-rolls, upwardly and forwardly inclined teeth mounted upon suitable supports fitted respectively to slide upon said rods, a rock-shaft having forwardly curved teeth thereon in operative proximity to said feed-rolls, means for actuating the same and a link for connecting said sliding tooth supports eccentrically to said rock-shaft, whereby the oscillation of the latter may serve to reciprocate the former.

4. In a machine of the class described, a feed roll provided with a longitudinal cut-away portion throughout its length, one face of which is radial while the other is at an obtuse angle thereto, a narrow longitudinal groove being formed at the base of said cut-away portion, and a bar L-shaped in cross-section, detachably fitted to said radial face and having one edge projected into said groove, as and for the purposes specified.

5. In a machine of the class described, the combination with inclined husking rolls, of a frame suspended above said rolls, means for actuating the same, a rearwardly extended gravity rake jointedly supported upon said frame said rake having an arm thereon fitted to engage a guide above it, and a stationary guide for engaging said arm to cause the lifting of the rake during the backward swing of the frame.

6. In a machine of the class described, the combination with inclined husking rolls, of swinging bars suspended above in the plane of the meeting faces of the rolls, means for vibrating said bars longitudinally, and gravity presser members each consisting of a sheet of metal casing arranged to loosely surround the bar upon which it is mounted, said casing being substantially triangular in side elevation and having its upper end jointedly connected to the bar, whereby said device may yield during its upward stroke to ride over the ears of corn upon the rolls.

7. In a machine of the class described, the combination of husking rolls a vibratory bar suspended longitudinally above said husking rolls, means for vibrating said bar, and a hollow sheet metal presser member pivoted at its upper end said member being formed to inclose said bar but made deeper at its lower end whereby it may normally depend therefrom.

In testimony whereof, I have signed this specification in the presence of two subscribing witnesses, this 9th day of February 1906.

JAMES W. PAIGE.

Witnesses:
D. H. FLETCHER,
C. E. JORDAN.